(12) United States Patent
Jorapurkar

(10) Patent No.: US 8,234,246 B1
(45) Date of Patent: Jul. 31, 2012

(54) METHOD AND APPARATUS FOR PROVIDING EVENT BASED DATA REPLICATION

(75) Inventor: Girish S. Jorapurkar, Roseville, MN (US)

(73) Assignee: Symantec Corporation, Mountain View, CA (US)

( * ) Notice: Subject to any disclaimer, the term of this patent is extended or adjusted under 35 U.S.C. 154(b) by 443 days.

(21) Appl. No.: 12/147,756

(22) Filed: Jun. 27, 2008

Related U.S. Application Data

(60) Provisional application No. 61/060,010, filed on Jun. 9, 2008.

(51) Int. Cl.
*G06F 17/30* (2006.01)

(52) U.S. Cl. .......................................... 707/633

(58) Field of Classification Search .......................... None
See application file for complete search history.

(56) References Cited

U.S. PATENT DOCUMENTS

| | | | |
|---|---|---|---|
| 6,460,055 B1 * | 10/2002 | Midgley et al. ........................ | 1/1 |
| 7,447,850 B1 * | 11/2008 | Del Rosso et al. ............ | 711/156 |
| 7,509,358 B1 * | 3/2009 | Bingham et al. ........................ | 1/1 |
| 2004/0139128 A1 * | 7/2004 | Becker et al. ................. | 707/204 |
| 2004/0158588 A1 * | 8/2004 | Pruet, III ........................ | 707/204 |
| 2007/0282921 A1 * | 12/2007 | Atluri et al. ................... | 707/202 |
| 2008/0010322 A1 * | 1/2008 | Lee et al. ...................... | 707/201 |

* cited by examiner

*Primary Examiner* — Bai D. Vu
(74) *Attorney, Agent, or Firm* — Campbell Stephenson LLP

(57) ABSTRACT

A method and apparatus comprising a replication appliance that is coupled to a backup media server. The media server communicates with the replication appliance via either an in-band communication or an out-of-band communication that informs the replication appliance of the completion of a backup within backup software. Upon receiving the notification of the event, the replication appliance will replicate the change data forming a replicated image of that data for storage either locally or remotely from the replication appliance. This replicated image may be used for archival purposes.

20 Claims, 2 Drawing Sheets

METHOD AND APPARATUS FOR PROVIDING EVENT BASED DATA REPLICATION

CROSS-REFERENCE TO RELATED APPLICATIONS

This application claims benefit of U.S. provisional patent application Ser. No. 61/060,010, filed Jun. 9, 2008, which is herein incorporated by reference.

BACKGROUND OF THE INVENTION

1. Field of the Invention

Embodiments of the present invention generally relate to data backup and replication techniques and, more particularly, to a method and apparatus for providing event based data replication.

2. Description of the Related Art

Modern computer systems relay upon data backup to ensure that a failure of a component of a computer system does not result in the loss of data. Thus, on a periodic basis, a backup copy of data stored upon a computer system is created and, typically, stored in a remote location, i.e., a tape backup is created and the tapes are stored in a location remote from the computer system. Upon computer system failure, the backup can be restored to a repaired or replacement computer system. The granularity of the backup results in some information being lost upon restoration, i.e., data created or changed after the last backup is lost.

Continuous Data Protection (CDP) is a service whereby every block of data written to this service is time-coded and recorded. New data stored by a CDP service does not overwrite existing data. This capability enables a user to access any version of a data object based upon time.

Providers of such services may provide these services using a standalone CDP appliance that is coupled to a host computer via a network. As such, CDP enables enterprises to increase their ability to provide sustained application and data availability through enhanced data recovery capabilities.

A typical CDP system is based upon a disk storage infrastructure to log the continuous data changes as well as provide a time index view into historic points and time. CDP systems can provide seamless, near-instantaneous recoveries from logical and physical data corruption events. With near-instantaneous recovery, the data can be recovered in seconds or minutes rather than hours that a traditional application and data restoration operation may entail.

Because CDP systems are designed to continuously log data changes as they occur, there is no defined point and time to create a replicated image of the logged data. Such replicated images are important for archival purposes.

Therefore, there is a need in the art for a method and apparatus causes a CDP system to create a replicated image of the data that has been logged based upon a particular event.

SUMMARY OF THE INVENTION

Embodiments of the present invention include a method and apparatus comprising a replication appliance that is coupled to a backup media server. The media server communicates with the replication appliance via either an in-band communication or an out-of-band communication that informs the replication appliance of the completion of a backup within backup software. Upon receiving the notification of the event, the replication appliance will replicate the replication data forming a replicated image of that data for storage either locally or remotely from the replication appliance. This replicated image may be used for archival purposes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
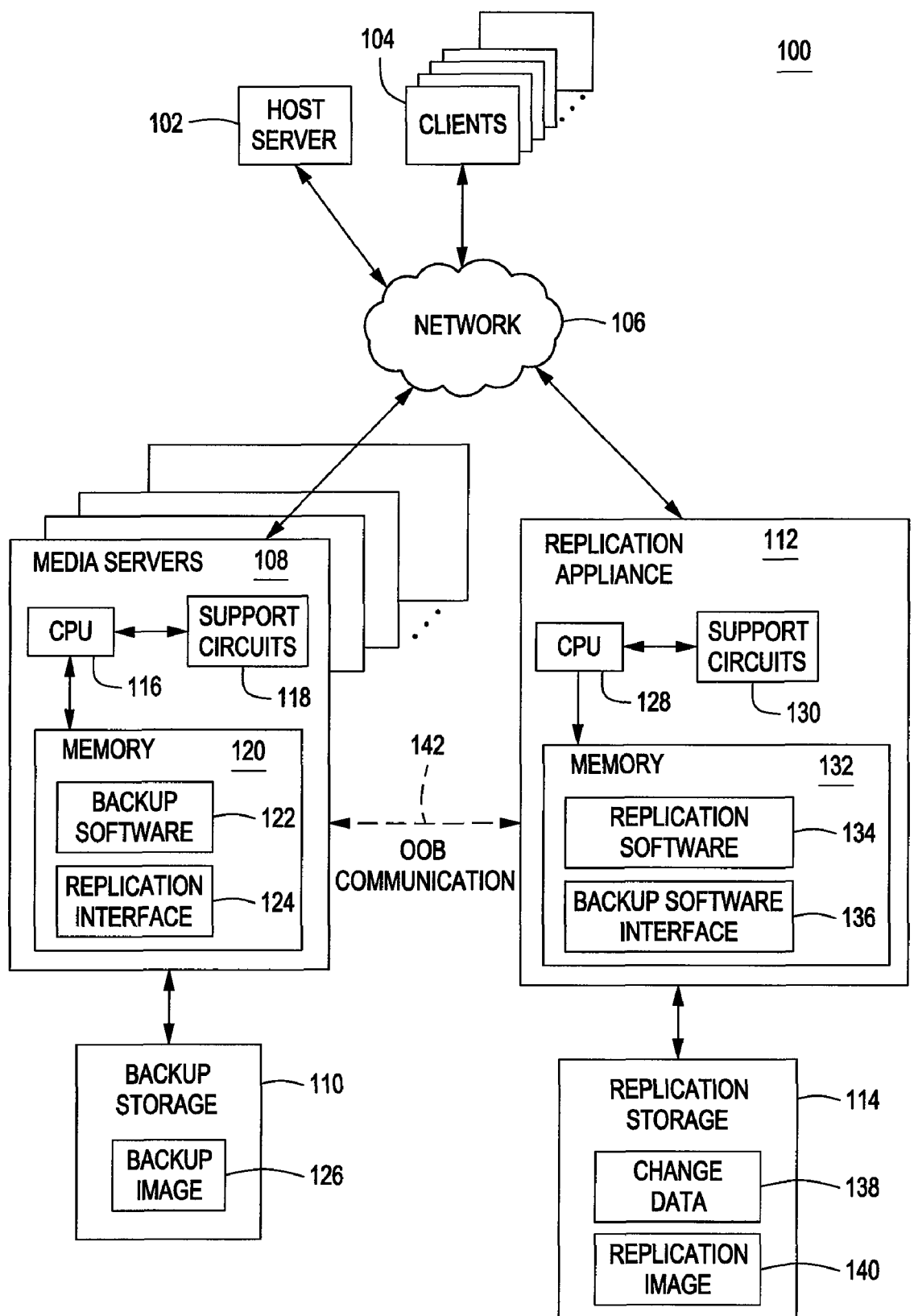
FIG. 1 depicts a block diagram of a computer system used for processing and replicating data in accordance with the present invention.

FIG. 1 depicts a computer system 100 comprising a host server 102, clients 104, network 106, media server(s) 108, backup storage 110, replication appliance(s) 112, and replication storage 114. The host server 102, the clients 104 and the network 106 form a typical computer network in which the clients utilize the host server for various computer resources and the clients perform various computing functions. The network 106 interconnects the host server and the clients 104. The network may be anyone of a number of forms of network including Ethernet, Wide Area Network, Local Area Network, Wireless Network, and any combination thereof. Any number of host servers 102 and clients 104 may be connected to the network 106.

One or more media servers 108 are also connected to the network 106. Each media server 108 provides backup storage services to the host server 102 and clients 104 connected to the network 106. These media servers 108 may form a cluster that allows for redundancy and high availability of backup services. The media servers 108 are coupled to a backup storage 110 into which data backups are stored.

Each media server 108 comprises a central processing unit (CPU) 116, supports circuits 118 and memory 120. The CPU 116 may be one or more of any one of many commercially available processors or microprocessors used for providing computing capability. The support circuits 118 are well known circuits and devices that support the functionality of the CPU 116. This support circuits 118 may comprise such well known circuits such as clock circuits, cache, network interface circuits, power supplies, and the like. The memory 120 may be any form or combination of semiconductor, optical or magnetic memory that stores computer instructions and/or data.

In one embodiment of the invention, the memory 120 stores backup software 122 and a replication interface 124. The backup software 122 is executed by the CPU 116 to perform backup services for the clients 104 and servers 102 connected to the network 106. For example, an agent executing on the servers and clients creates copies of data and applications located on the servers and clients. These copies (backups) are duplicated to the backup storage via the media servers 108. The backup software 122 may be NetBackup manufactured by Symantec Corporation of Cupertino, Calif.

The replication interface 124, as discussed below, is executed to transmit certain information to the replication appliance(s) 112. This information identifies a particular backup and when the backup is complete.

The backup images 126 generated by the backup software 122 during the backup processes are stored in backup storage 110. Such storage may be local may be remote, or combination thereof. In some instances the back storage 110 may be distributed forming multiple backup locations for the backup image 126 in a variety of geographic locations.

The replication appliance(s) 112 are coupled to the network 106 to operate as a conventional CDP-type appliance, in that, changes to data across the network are continuously logged within the replication appliance and/or the replication storage 114. When utilized in a continuous logging mode, the replication appliance may also be referred to as a CDP device or CDP appliance. In all instances, such devices continuously log changes to data (referred to herein that occur on one or more computers (server(s) and/or client(s). In other embodiments, the change logging may occur periodically or intermittently (i.e., discrete logging). The replication appliance performs replication of information generated using either continuous or discrete logging techniques.

The replication appliance(s) 112 comprise a Central Processing Unit (CPU) 128, support circuits 130 and memory 132. The CPU 128 may be one or more of any one of many commercially available processors or microprocessors. The support circuits 130 support the operation and functionality of the CPU 128. The support circuits 130 are well known circuits and devices such as clock circuits, cache, power supplies, network interface circuits, and the like. The memory 132 may be any combination of semiconductor, magnetic, and optical memory used to store data and/or computer instructions.

In one embodiment of the invention, the memory 132 stores replication software 134 and a backup software interface 136. The replication software 134 operates in a conventional manner for logging data changes occurring on the network 106. These changes are stored as change data 138 in the replication storage 114. The backup software interface 136 communicates with the media servers 108 in accordance with various embodiments of the present invention.

In one embodiment of the invention, upon the media servers 108 generating a particular backup image and completing that backup image (i.e., storing a backup of a particular client 104 or server 102), the replication interface 124 communicates a trigger (also referred to herein as an event) identifying a particular backup and the time at which the backup was completed.

This event is communicated either using an in-band communication protocol for the replication appliance 112 (i.e., en event message is embedded in the data stream used for logging changes) or through an out-of-band (OOB) communication protocol as shown by dashed path 142. The OOB communication protocol may use a channel through the network 106 that is not typically used to communicate data to the replication appliance(s), or the channel may be a distinct communication path specifically for communicating events to the replication appliance(s) 112.

In either instance, in-band or OOB, a message is transmitted from the media server(s) 108 identifying a backup and when the backup was complete. If an in-band communication protocol is used, the message need only communicate the particular backup that was completed. The protocol for sending changes to the replication appliance(s) is typically time-coded, thus additional timing information is unnecessary.

Upon a replication appliance 112 receiving the event, the backup interface software communicates to the replication software to initiate a replication process for replicating the change data to form a replicated image 140 of that data. This replicated image 140 can be used for archival purposes either storing locally or in a remote location. For example, when using remote storage, the replicated image may be stored via a wide-area-network (WAN) or via a storage area network (SAN). In other embodiments the replicated image may be stored in a distributed manner in a plurality of geographic locations.

In one embodiment of the invention, the media servers 108 may produce multiple backups simultaneously. Upon completion of each backup, an event is transmitted to the replication appliance(s). If, by way of example, three backups are being performed—backups 1, 2 and 3 and backup 2 is completed first, while backup 1 is at 50% completion and backup 3 is at 25% completion. When the event is sent for backup 2, the replication appliance may replicate all the change data at that time. When a backup 1 event occurs, only the remaining 50% of the change data may be replicated and similarly for the backup 3 event, only the remaining data needed to be replicated upon backup 2 event occurring is replicated. Such a procedure may improve the speed of replication.

In other embodiments, change data associated with a particular backup may be replicated in response to each event that identifies the particular backup.

Figure 2:
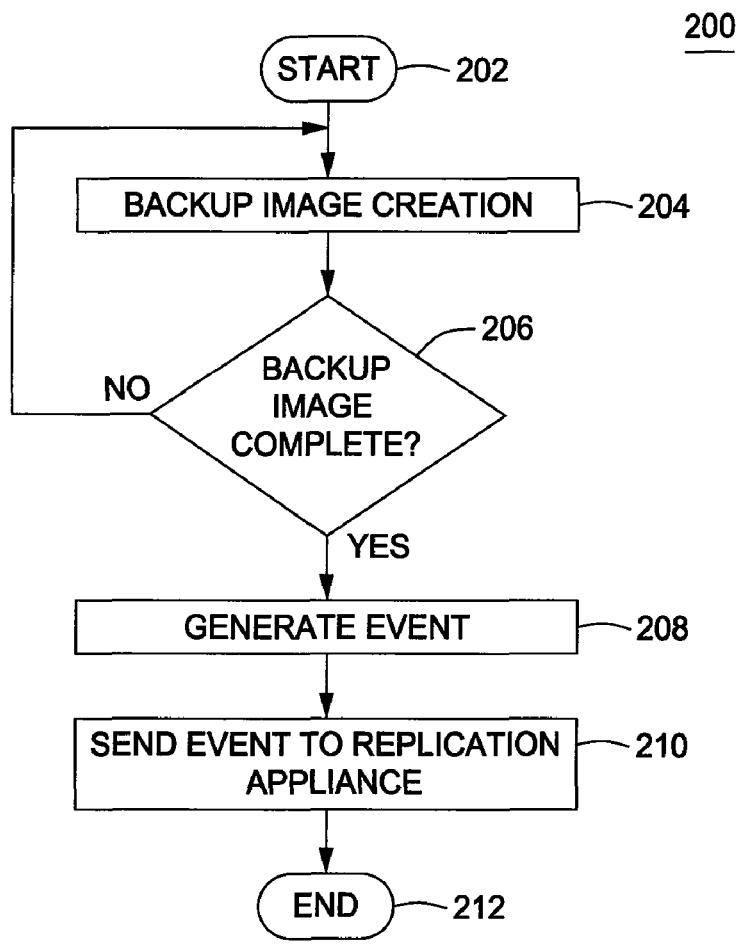
FIG. 2 is a flow diagram of a replication interface method in accordance with one embodiment of the present invention.

FIG. 2 depicts a flow diagram of the replication interface 124 as executed on the media servers 108. The method 200 begins at step 202 and proceeds to step 204. At step 204, the backup image is created using a typical backup process. At step 206, the method 200 queries whether the backup image is complete. If the backup image is not complete the method proceeds to step 204 to continue with the backup image creation process. If, at step 206, a backup image is indicated as being complete, the method 200 proceeds to step 208. At step 208, the method 200 generates an event and, at step 210, the event is sent to the replication appliances either through the OOB communication path or the in-band communication path. The method 200 ends at step 212.

Figure 3:
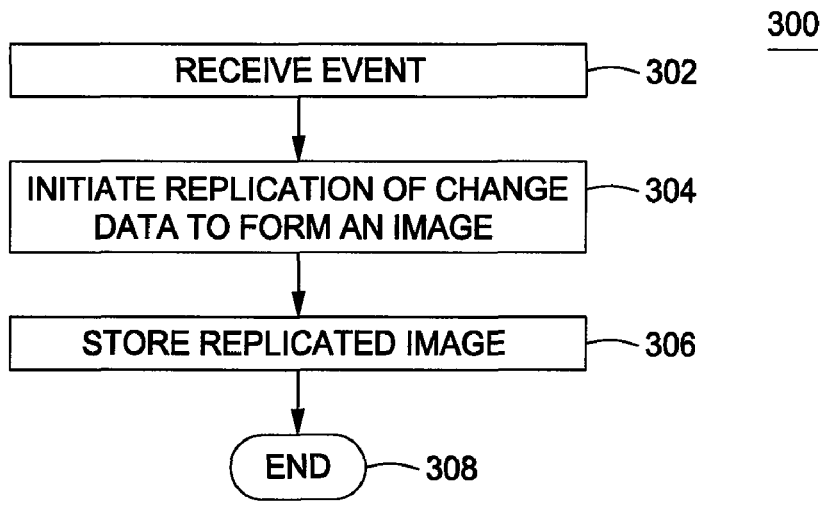
FIG. 3 is a flow diagram of a method of performing a backup software interface in accordance with one embodiment of the present invention.

FIG. 3 depicts a method 300 of operation of the backup software interface 136 as executed by the replication appliance 112. Method 300 begins at step 302 upon the reception of the event generated by method 200. When the event is received at step 302, the method 300 precedes to step 304, wherein the method 300 initiates a replication process of the change data to form an image representing some or all of the change data. At step 306, the replicated image is stored in replication storage 114. The method ends at step 308.

In this manner, by triggering the replication appliance to replicate the change data in accordance with the completion of a backup by the media server, the replication appliances have a defined occurrence or trigger that indicates when the change data should be replicated. Consequently, the change data is replicated in accordance with the same criteria that generates a backup. IN addition, the backup and the replicated image are consistent with one another. Such consistency may be important during a disaster recovery procedure when the data from backups and replication images are merged during the recovery process.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving an event generated by a backup system, wherein
      the backup system is configured to generate a backup of stored data,
      the receiving is performed by a computing device implementing a continuous data protection (CDP) system,
      the CDP system is configured to generate change data that indicates changes to the stored data,
      the event indicates that the backup of the stored data has been created by the backup system, and
      the event comprises an identifier of the backup;
   in response to receiving the event, replicating the change data to form a replicated image, wherein
      the replicating is performed by the CDP system, and
      the replicated image comprises a copy of the change data; and
   storing the replicated image.

2. The method of claim 1 wherein
   the event is received through an out-of-band communication path and the event indicates a time at which the backup was completed.

3. The method of claim 1 wherein
   the event is received as a time-coded message sent through an in-band communications path, and
   the time-coded message indicates a time at which the backup was completed.

4. The method of claim 1 further comprising:
   merging first data from the backup with second data from the replicated image; and
   recovering data using a result from the merging.

5. The method of claim 1 wherein
   the replicated image comprises change data related to data contained in the backup.

6. The method of claim 1 wherein
   the event identifies a time at which the backup was completed.

7. A non-transitory computer-readable storage medium storing program instructions executable to implement a continuous data protection system, wherein the continuous data protection (CDP) system is configured to:
   receive an event generated by a backup system, wherein
      the backup system is configured to generate a backup of stored data,
      the event indicates that the backup of the stored data has been created by the backup system, and
      the event comprises an identifier of the backup;
   generate change data that indicates changes to the stored data, and
   replicate the change data to form a replicated image, in response to receiving the event, wherein
      the replicated image comprises a copy of the change data.

8. The non-transitory computer-readable storage medium of claim 7 wherein
   the event identifies a time of completion of the backup.

9. The non-transitory computer-readable storage medium of claim 7 wherein
   the event is received from the backup system via an in-band communications path.

10. The non-transitory computer-readable storage medium of claim 7 wherein
    the event is received as a time-coded message sent from the backup system via an out-of-band communications path, and
    the time-coded message comprises a time at which the backup was completed.

11. The non-transitory computer-readable storage medium of claim 7 wherein
    the replicated image is stored remotely.

12. The non-transitory computer-readable storage medium of claim 7 wherein
    the change data comprises all data that the continuous data protection system has detected as changed.

13. The non-transitory computer-readable storage medium of claim 7 wherein
    the replicated image comprises data that was not replicated into a prior replicated image.

14. The non-transitory computer-readable storage medium of claim 7 wherein
    the replicated image comprises data related to the backup.

15. A system comprising:
    a processor; and
    a memory coupled to the processor, wherein the memory stores program instructions executable to implement a continuous data protection system (CDP), wherein the (CDP) system is configured to:
       receive an event generated by a backup system, wherein
          the backup system is configured to generate a backup of stored data,
          the event indicates that a backup has been created by the backup system, and
          the event comprises an identifier of the backup;
       generate change data that indicates changes to the stored data, and
       replicate the change data to form a replicated image, in response to receiving the event, wherein
          the replicated image comprises a copy of the change data.

16. The system of claim 15 wherein the event identifies a time of completion of the backup.

17. The system of claim 15 wherein the CDP system sends the replicated image to a remote storage.

18. The system of claim 15 wherein the change data comprises all data that the CDP system has detected as changed.

19. The system of claim 15 wherein the replicated image comprises logged changes that were not replicated into a prior replicated image.

20. The system of claim 15 wherein
    the replicated image comprises data related to the backup.

* * * * *